(12) United States Patent
Bedard et al.

(10) Patent No.: US 6,220,792 B1
(45) Date of Patent: Apr. 24, 2001

(54) SLURRY DISTRIBUTOR

(76) Inventors: Claude Bedard, 904, rue Généreux, Repentigny, Qc (CA), J5Y 1T7; John Lemieux, 17807, rue Arthur-Hooper, Pierrefonds, Qc (CA), H9J 3P6

(*) Notice: Subject to any disclaimer, the term of this patent is extended or adjusted under 35 U.S.C. 154(b) by 0 days.

(21) Appl. No.: 09/425,883

(22) Filed: Oct. 25, 1999

(51) Int. Cl.[7] .................................................. B65G 53/40
(52) U.S. Cl. ........................ 406/154; 406/165; 406/177; 406/198; 406/36; 239/696; 239/704; 414/800; 414/299
(58) Field of Search ..................................... 406/155, 165, 406/167, 14, 177, 182, 198; 239/696, 704; 414/800, 299, 300; 405/117, 36

(56) References Cited

U.S. PATENT DOCUMENTS

| | | | |
|---|---|---|---|
| 704,181 | * | 7/1902 | Foote . |
| 1,304,553 | * | 5/1919 | Gadd . |
| 1,599,371 | * | 9/1926 | Payzant . |
| 4,175,591 | | 11/1979 | Welker . |
| 4,263,021 | * | 4/1981 | Downs et al. . |
| 4,531,784 | | 7/1985 | Karlovsky . |
| 4,653,961 | * | 3/1987 | Hashimoto ............. 405/258 |
| 4,818,419 | | 4/1989 | Mims . |
| 5,211,511 | * | 5/1993 | Deal, Jr. ............... 405/258 |
| 5,261,485 | | 11/1993 | Thornton et al. . |
| 5,628,262 | * | 5/1997 | Nelson ................. 111/130 |

* cited by examiner

*Primary Examiner*—Christopher P. Ellis
*Assistant Examiner*—Richard Ridley

(57) ABSTRACT

The slurry distributor comprises two or more square pipe sections in end-to-end relation having an inlet at one end for connection to a slurry supply and provided with discharge openings equally spaced longitudinally thereof; on each side of the square pipe for discharge of the slurry, the openings being successively obstructed manually or by deposited solids from the slurry itself piling up on the original ground level. The distributor is used to control the slurry composition for dyke building and general tailings disposal consisting of mine tailings.

11 Claims, 6 Drawing Sheets

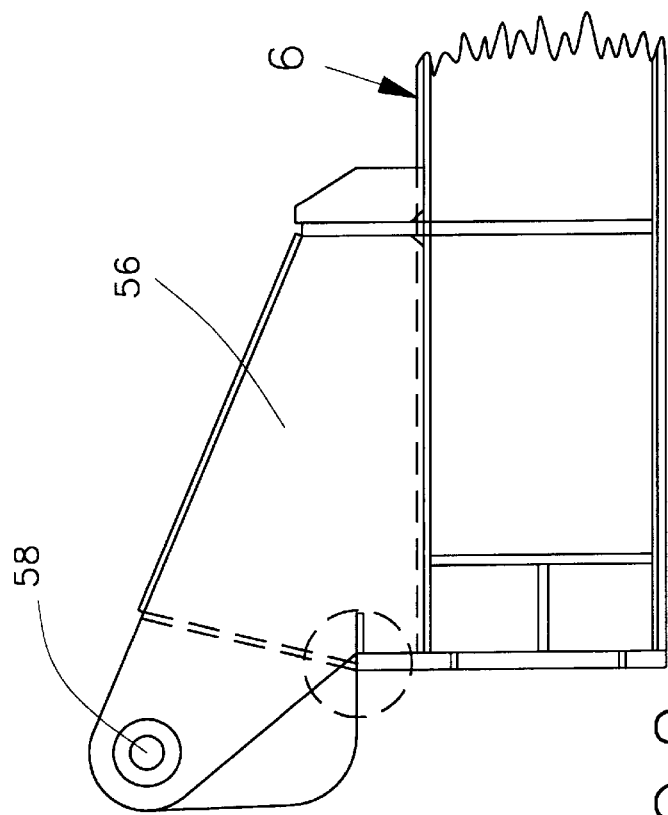
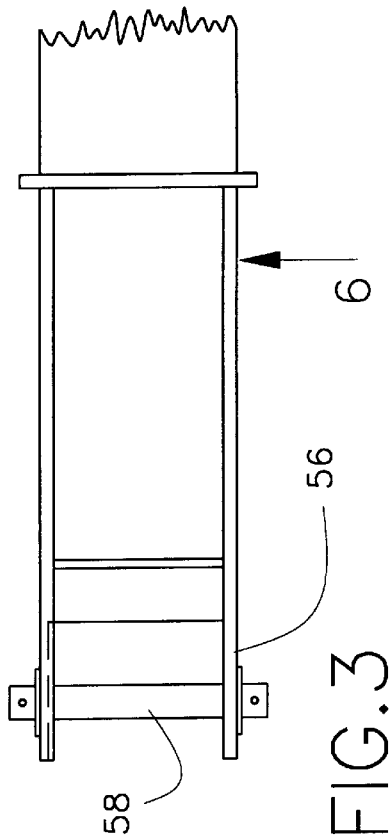
FIG. 2
FIG. 3
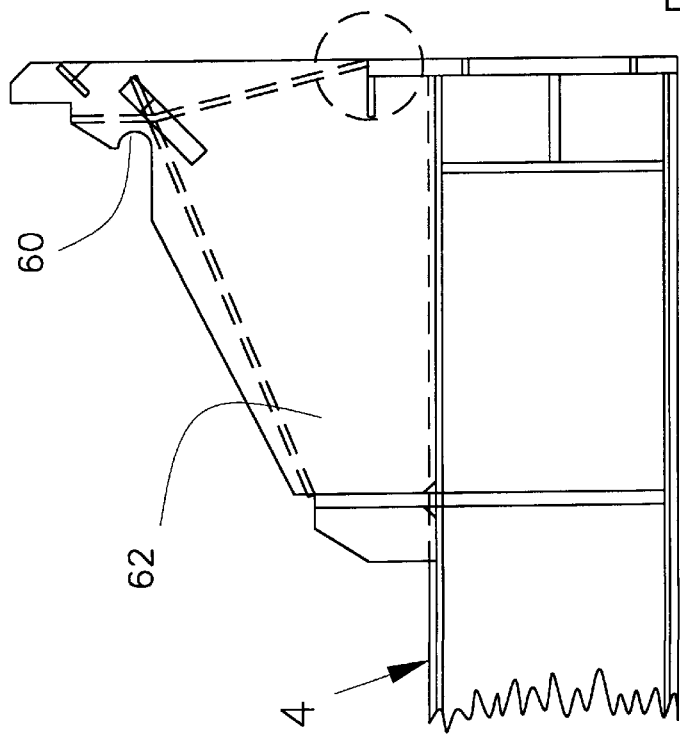
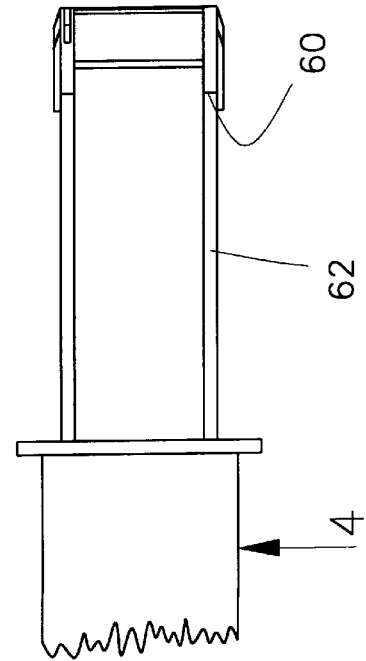

SLURRY DISTRIBUTOR

FIELD OF THE INVENTION

The present invention relates to slurry distributors for the control of slurry composition, building dykes and general tailing disposal from mine tailings to form a retaining area for mine tailings and concentration process water protection berms and dykes.

BACKGROUND OF THE INVENTION

It is known to provide a main large diameter pipe fed with slurry made of mine residues and having a series of small diameter spigots, which can be successively closed or opened manually on one side.

The slurry is discharged at selected points on the ground for dyke building and when the slurry pile is sufficiently high at one spigot the latter is closed and opened again after extending the branch to an adjacent location. Once a certain area has been filled with the slurry, the branches are disconnected from the main pipe and again have to be connected after moving the entire assembly to another site.

This system has several disadvantages. It requires a large pumping capacity because of the resistance to the flow of slurry through the small diameter spigots. It is labor intensive since the branches have to be extended continuously. The branches are connected to and disconnected from the main pipe each time the system is moved to another site. The main drawback is the fact that the starter dyke which must be mechanically built to form an abutment for the succeeding deposition of the slurry must be quite high and wide requiring several weeks of work by mechanical earth movers such as bulldozers to place the required volume for the starter dyke. This represents a major portion of the cost of building or increasing the height of the retaining dyke. In addition, this system does not lend itself to general tailings disposal.

It is also known that for small smaller slurry flow requirements to provide a pipe with holes in the bottom suspended on wood racks. This method allows the deposition of the coarse portion of the tailings through the holes until they are successively obstructed. A length of this perforated pipe is installed perpendicular to the starter dyke.

This system has several disadvantages. It can only be used for general tailings disposal and is not efficient (in many cases inadequate) for dyke construction because it does not allow for a uniform distribution of the slurry material from the beginning to the end of the pipe, hence the deposition angle formed at each successive hole becomes flatter and flatter. It does not allow for control of the slurry composition.

OBJECTS OF THE INVENTION

It is therefore the general object of the present invention to overcome the above noted disadvantages in that the system of the invention requires starter dykes of minimum size, are less labor intensive in that no work is required to the distributor duct until it is displaced from one site to the other several days later and in that it requires less pumping capacity (20%) than conventional systems with branches fitted with spigots.

A second object of the present invention is the provision of a slurry distributor, which is less expensive to build and maintain than conventional distributors, and which is easily installed, advanced and removed onto and from a dyke building site.

A third object of the present invention is the provision of a slurry distributor, which can be used for general tailings disposal due to its capacity control the tailings composition and provide a uniform distribution of the slurry material along the entire length of the distributor.

SUMMARY OF THE INVENTION

This invention is directed to a slurry distributor which comprises a duct with an inlet end and an outer end, supports under said duct for supporting the same above ground in generally horizontal position, said duct having longitudinally spaced slurry discharge openings, said inlet end adapted to be connected to a supply of slurry under pressure whereby said slurry can be discharged from said duct directly unto the ground with the solid content of said slurry gradually forming dyke portions under and adjacent said duct along the length thereof and progressively obstructing said openings from said inlet end to said outer end. The duct is of generally rectangular cross-section and has a ceiling, a floor and side walls, said discharge openings made in said side walls, said opening arranged in pairs, the opening of each pair are aligned across of said duct and further including inverted V-shape baffles on said floor with the apices of said V-shape baffles meeting along the centre line of said floor and said baffles diverging in a direction opposite to said inlet end and ending at said openings.

Preferably, flat strips are secured at an angle to said side walls and to said floor and extending upstream from a single pair of registering discharge openings just upstream of the support.

Preferably, the top of the discharge openings on one side of said duct are at a lower level than the top of the discharge openings on the other side of said duct.

Preferably, the duct is made of two laterally spaced I-beam sections with the web of said I-beam forming said side walls and of top and bottom plates secured to the top and bottom flanges of said beam and forming with said flanges said ceiling and said floor of said duct.

Preferably, each discharge opening has along its sides vertically arranged guide ways located externally of said top and bottom flanges of said I-beam, and closure plates vertically guided in said guide ways.

Preferably, the duct is composed of two or more duct sections in end-to-end relation with connectors at each end of each section for connecting said sections.

Preferably, each duct section has a hook fixed to and upwardly protruding from its ceiling at the centre of gravity of said section to be bodily lifted and transported.

Preferably, said connectors include a pair of transversely registering ears upstanding from each end of said section, the ears at one end overlapping and removable attached to the ears at another end of an adjacent section whereby an additional section can be connected pin to an already installed section while inclined and then lowered to become in abutment with said already installed section with the adjacent ends of said two sections in abutment and in alignment.

Preferably, the openings on both sides of said duct have a sill at the same level above said floor but below the apices of said baffles and the openings on one side of the duct are higher than the openings on the other side of said duct.

Preferably, each of said supports is a box-like member with a downward extending skirt at the bottom of said support.

Preferably, a connector removable fitted to said inlet end of said duct, having a rectangular cross-section at one end to conform with the cross-sectional shape of said duct and having circular cross-section at the other end to be connected to a slurry supply cylindrical pipe.

Preferably, spaced apart sleeve members are secured to the underside of one of said duct sections spaced apart to receive the forks of a fork-truck and inclined with respect to the longitudinal axis of said duct section so that said duct section is inclined to the horizontal when lifted by the forks of said lift truck.

Preferably, there are hook means at the center of gravity of said duct section protruding upwardly from the ceiling of the same.

BRIEF DESCRIPTION OF THE DRAWINGS

In the annexed drawings, like reference characters indicate like elements throughout.

FIG. 2 is a side elevation of two duct sections showing their coupling portions;

FIG. 3 is a top plan view of the view of the coupling portions shown in FIG. 2;

DETAILED DESCRIPTION OF THE PREFERRED EMBODIMENT

The distributor of the invention consists of a pipe or duct 2 of generally rectangular cross-section being for instance fifteen inches wide by twenty inches high. The duct is composed for instance of two duct sections, namely duct section 4 which may have seventy feet in length and duct section 6 which may have forty feet in length.

Figure 4:
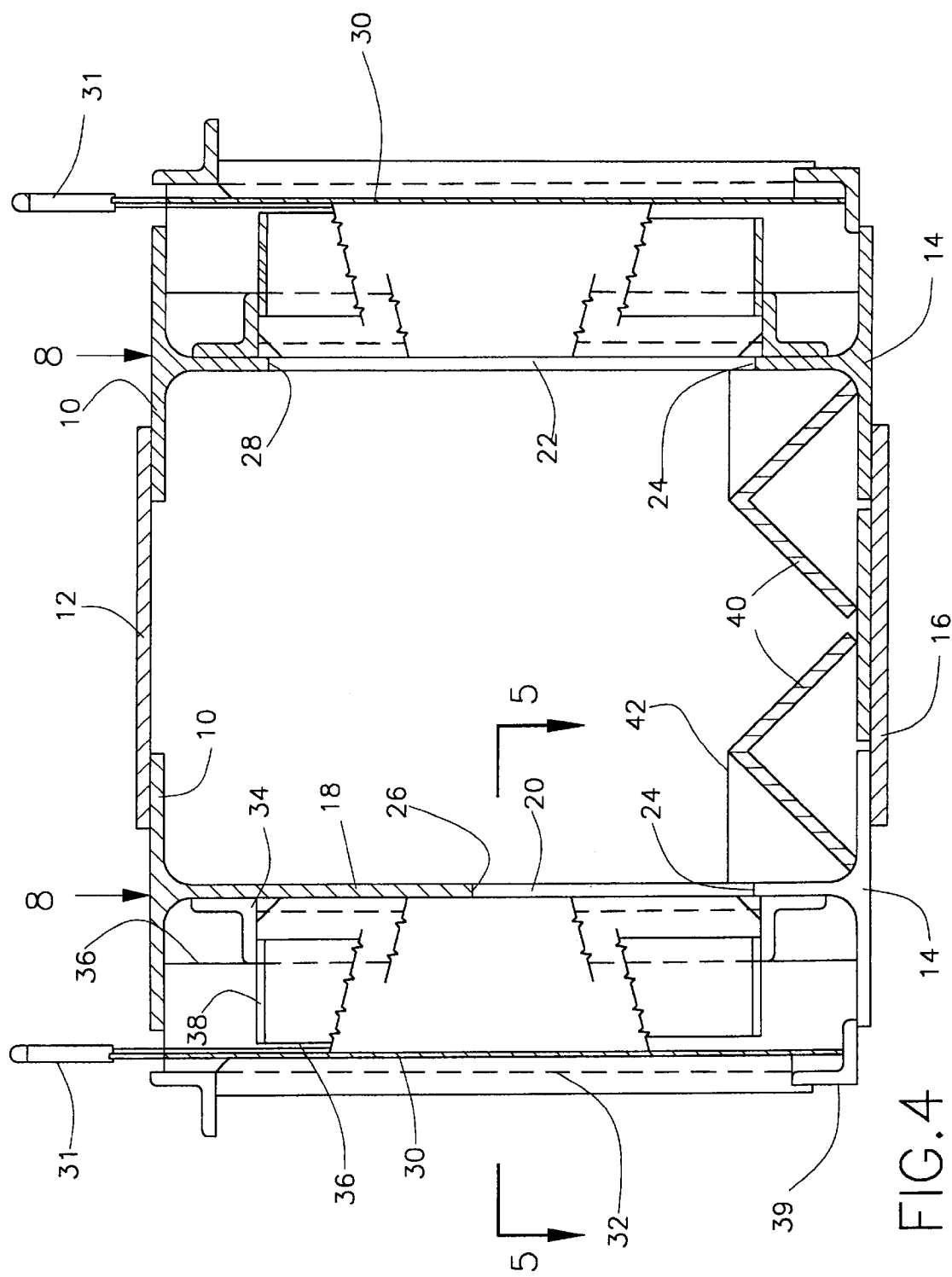
FIG. 4 is a cross-section of one duct section taken along line 4—4 of FIG. 6.

Each duct section is formed by two laterally spaced I-beams 8 as shown in FIG. 4, the top flanges 10 of each I-beam together with an intervening plate 12 welded thereto form the ceiling of the duct while the bottom flanges 14 and the bottom plate 16 welded thereto form the floor of the duct. The web 18 of I-beams 8 form the side walls of the duct. These side walls are provided with left and right discharge openings 20 and 22 respectively looking in the direction of flow of the slurry as shown by arrow A in FIGS. 1 and 6.

Figure 1:
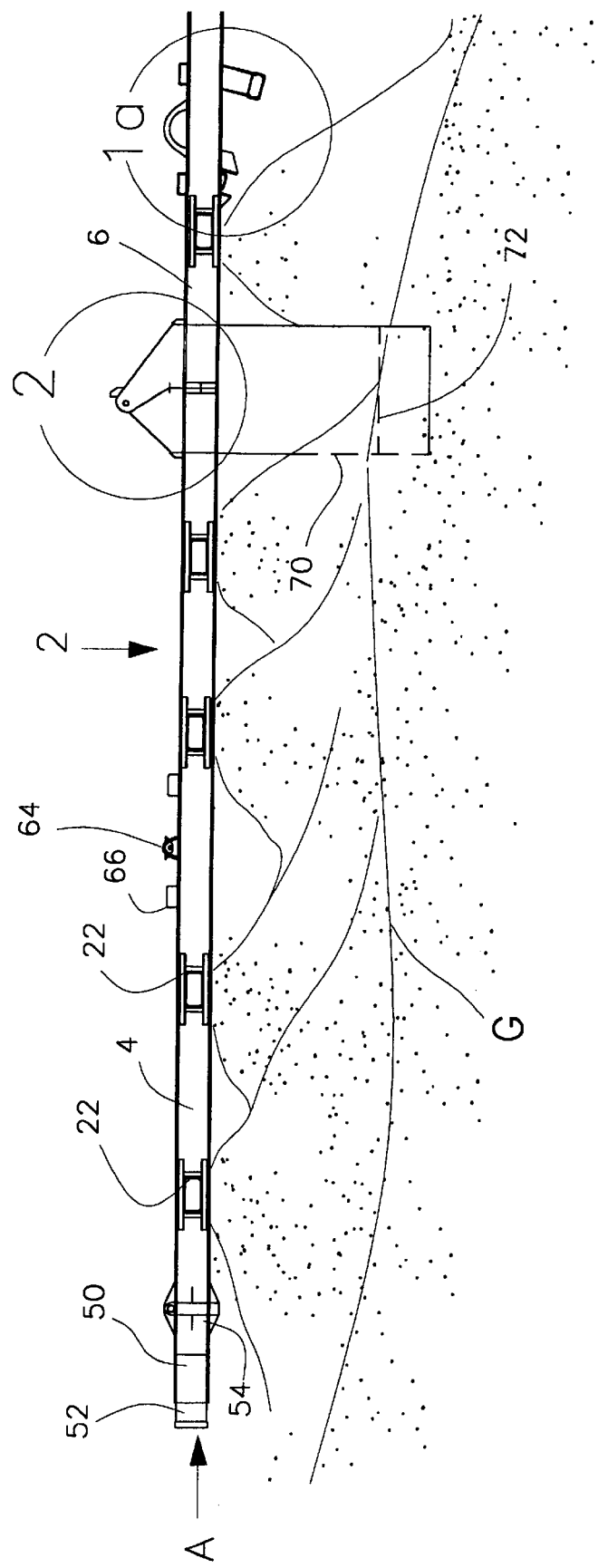
FIG. 1 is a side elevation of the distributor of the invention installed on a dyke building site.

These discharge openings are arranged in pairs the openings of each pair aligned across the duct and each pair of openings are equally longitudinally spaced for a distance of, for instance, about ten feet along the length of duct 2 as shown in FIG. 1. The number, placement and size of the openings is determined from the characteristics of the slurry material flowing in the duct. Each opening 20 and 22 has a sill 24 which is spaced above the floor 14, 16, the left discharge openings 20 have a top edge 26 which is at a lower level than the top edge 28 of right discharge openings 22 for a purpose which will be later described.

Figure 5:
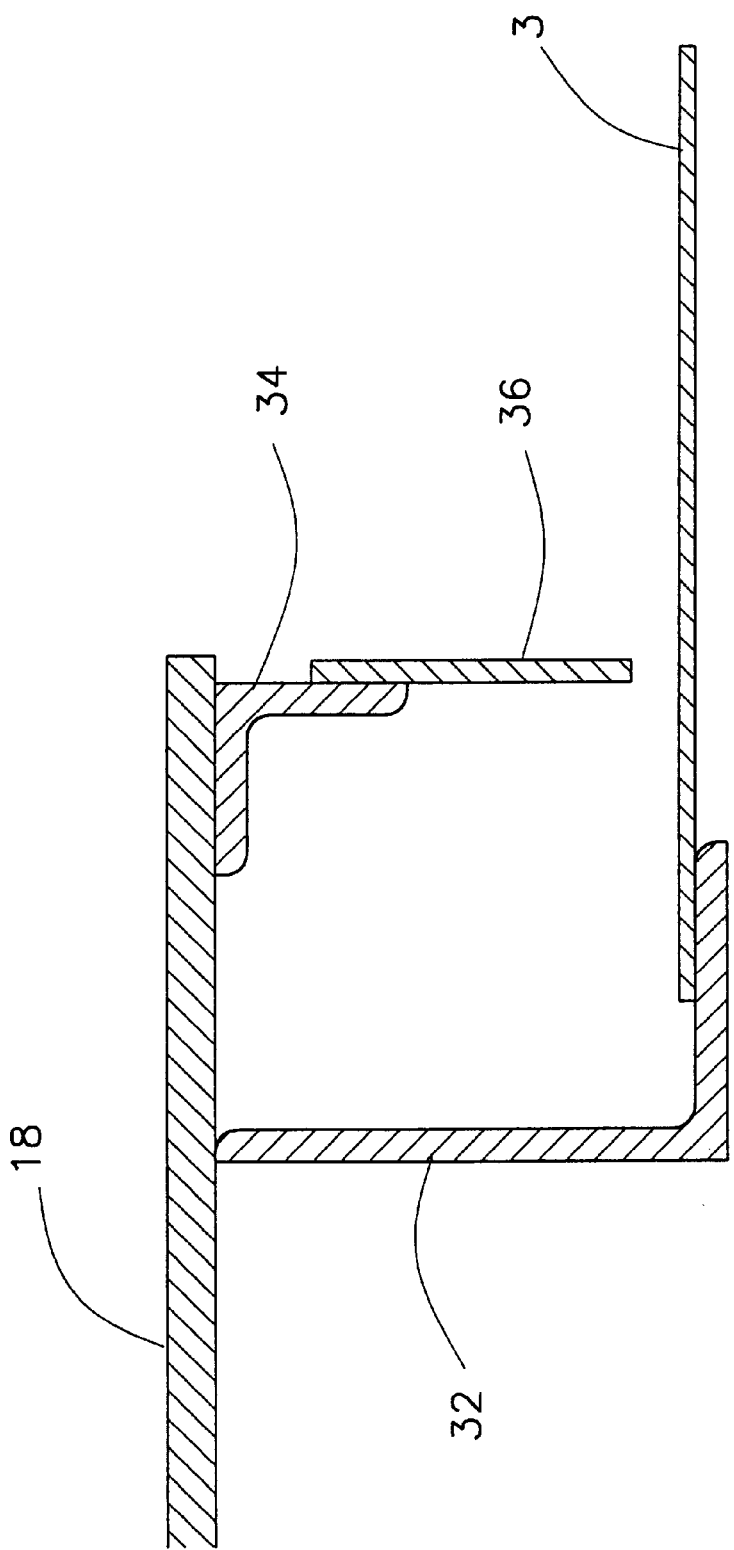
FIG. 5 is a cross-section taken along line 5—5 of FIG. 4.

Each opening can be closed in a non-waterproof manner by means of a slide door 30 having a handle 31. As shown in FIGS. 4 and 5, the slide door is guided for up and down movement by means of guideways formed on each side of the opening by an L-shaped vertical bar 32 and vertical angle irons 34 extended by a flat vertical bar 36. The door is also guided by a flat horizontal bar 38 and comes to rest on an angle bar 39.

Figure 6:
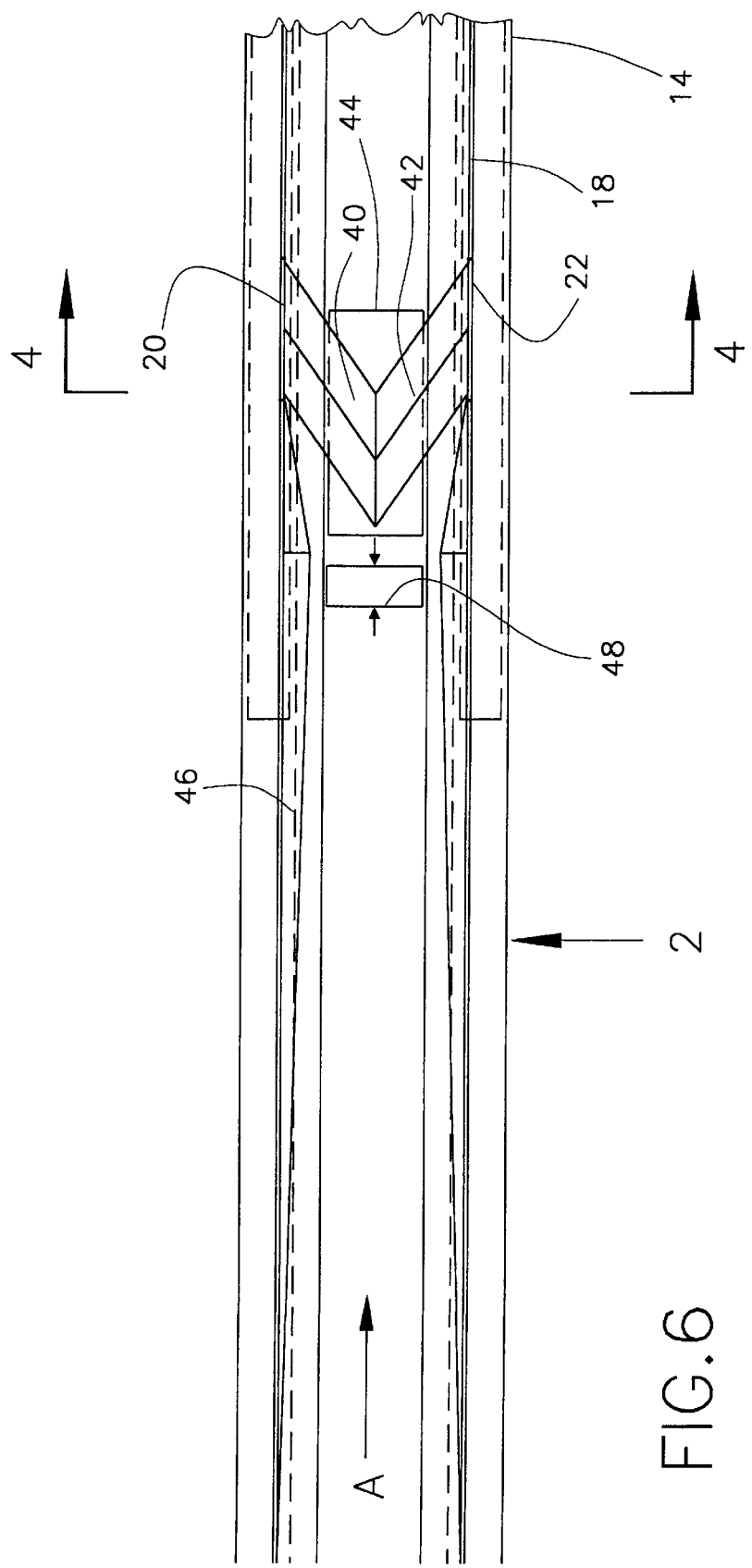
FIG. 6 is a top plan section of one portion of the duct of the invention.

The floor 14, 16 of the duct 2 is provided with deflector baffles 40 formed of angle irons secured in upside down position and diverging in the direction of the slurry flow as shown at A in FIG. 6. Baffles 40 are welded to flanges 14 and to centre filler plate 44.

The apices 42 of the deflector baffles 40 are at a level slightly higher than the level of the sills 24 of the left and right discharge openings 20, 22 as shown FIG. 4. Deflector plates 46 are secured at an angle to the sidewalls and floor at each corner thereof and extend upstream from baffles 40 as clearly shown in FIG. 6. A floor hole 48 is made through the floor 14, 16 just upstream from the baffles 40 and support 70 as shown in FIG. 6.

The inlet end of the duct section 4 is connected to a connector tube 50 which has a cylindrical inner end 52 to be connected to a standard cylindrical pin for supplying slurry under pressure. The connector tube 50 has an outer end portion 54 of rectangular cross-section sized to form a but joint with the inner end of duct section 4.

As shown FIGS. 2 and 3, the inner end of duct section 6 is provided with a pair of upstanding ears 56 supporting a cross-pin 58 adapted to engage the recesses 60 of ears 62 upstanding from duct section 4 when duct section 6 is upwardly inclined with respect to duct section 4. Subsequent, lowering of duct section 6 brings the two adjacent ends of the sections 4, 6 in abutment.

Duct section 4 (see FIG. 1) is provided with a hook 64 at its centre of gravity for handling the duct section 4 with a loader or the like. Also, straps 66 are disposed on each side of the hook 64 for raising and lowering the duct section by means of a fork truck or the like.

Figure 1A:
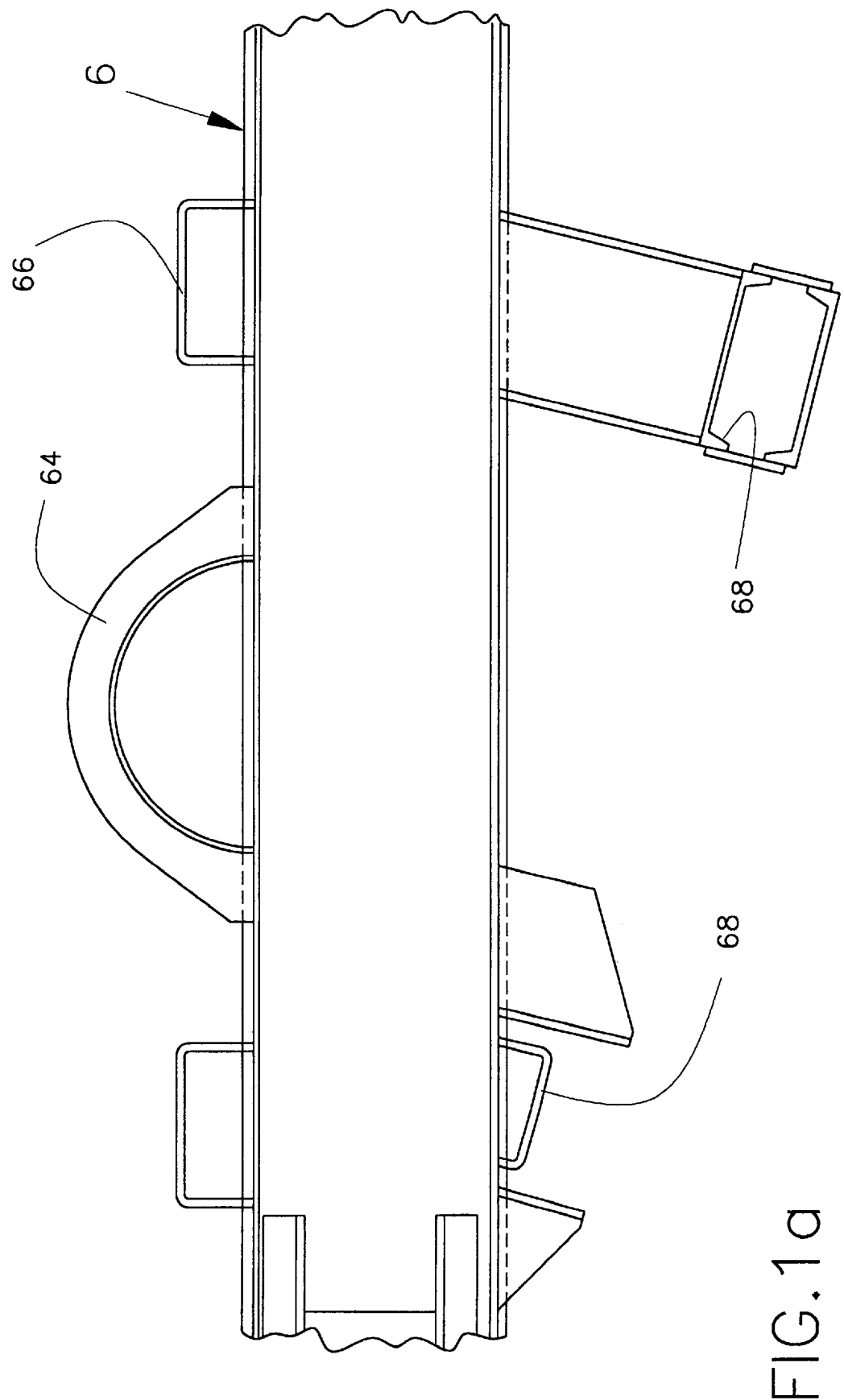
FIG. 1a is an enlarged view of a portion of one of the two duct sections.

Similarly, as shown in FIG. 1a, duct section 6 is provided at its centre of gravity with a hook 64 and a pair of upstanding straps 66 and it is further provided with fork receiving sleeves 68 protruding from the floor of the duct section and inclined with respect to the longitudinal axis of the section whereby said duct section can be manipulated by a fork truck while at a suitable inclination for hooking onto the previously laid duct section 4 by means of the connector assembly 56 to 62.

The duct 2 is supported in generally horizontal position above ground G by means of a support 70 in the form of a box provided at its bottom with a skirt 72 to be inserted into the ground so as to stabilize a support 70, which is positioned under the connector assembly 56 to 62.

The slurry is normally composed of water and 20 to 60% solid material by weight of different size distribution. This material comes from the residues of the ore concentration operation and serves to build a dyke to eventually form a retaining pond for receiving the mine tailings. A starter dyke is first made using bulldozers or other mechanical equipment, this starter dyke of generally trapezoidal cross-section is made as small as possible in cross-section because of the heavy expenditure involved in the use of mechanical earth moving equipment as opposed to hydraulically depositing the material with the slurry distributor.

The duct 2 is laid along and a suitable distance determined by slurry characteristics from the starter dyke on the pond side thereof and is connected by the connector tube 50 to a slurry supply under pressure. The slurry is discharged from the discharge openings 20, 22 closest to the connector tube and gradually forms a mound on each side of and underneath the duct 2 which becomes sufficiently high to obstruct these first upstream openings 20, 22. The slurry continues to the next downstream pair of discharge openings and is discharged at this site to form a mound. The process is continued until the deposited material successively obstructs all the openings.

The material is also directly discharged underneath the duct by the floor holes 48. To prevent the discharge of granular material to build up to a level higher than duct 2, the slide doors 30 are inserted to close the no-longer discharging openings 20, 22.

The support 72 becomes fully embedded into the deposited material.

One side of the discharge openings 20 is facing the starter dyke.

These openings have a lower height than the discharge opening 22 so that the finer portion of the slurry is trapped within the top of duct 2 and is not discharged from this side of the duct, only the coarser material being discharged so that the dyke can be built with as steep a slope as possible on the side of the starter dyke.

After the duct has become practically embedded in the granular material, it is moved to another site further along the length of the starter dyke to continue the building of the main dyke.

We claim:

1. A slurry distributor controlling the slurry composition in a way allowing for dyke building or general tailings disposal comprising a duct with an inlet end and an outer end, supports under said duct for supporting the same above ground in generally horizontal position, said duct having longitudinally spaced slurry discharge openings, said inlet end adapted to be connected to a supply of slurry under pressure whereby said slurry can be discharged from said duct directly unto the ground with the solid content of said slurry gradually forming dyke portions under and adjacent said duct along the length thereof and progressively obstructing said openings from said inlet end to said outer end, said duct is of generally quadrilateral cross-section and has a ceiling, a floor and side walls, said discharge openings made in said side walls, said openings arranged in pairs, the openings of each pair are aligned across of said duct and further including inverted V-shape baffles on said floor with the apices of said V-shape baffles meeting along the centre line of said floor and said baffles diverging in a direction opposite to said inlet end and ending at said openings.

2. A slurry distributor as defined in claim 1, further including flat strips secured at an angle to said side walls and to said floor, and extending upstream from a single pair of registering discharge openings just upstream of the support.

3. A slurry distributor as defined in claim 2, wherein the top of the discharge openings on one side of said duct are at a lower level than the top of the discharge openings on the other side of said duct.

4. A slurry distributor as defined in claim 3, wherein said duct is made of two laterally spaced I-beam sections with the web of said I-beam forming said side walls and of top and bottom plates secured to the top and bottom flanges of said beam and forming with said flanges said ceiling and said floor of said duct.

5. A slurry distributor as defined in claim 4, wherein each discharge opening has along its sides vertically arranged guide ways located externally of said top and bottom flanges of said I-beam, and closure plates vertically guided in said guideways.

6. A slurry distributor as defined in claim 4, wherein the openings on both sides of said duct have a sill at the same level above said floor but below the apices of said baffles and the openings on one side of the duct are higher than the openings on the other side of said duct.

7. A slurry distributor controlling the slurry composition in a way allowing for dyke building or general tailings disposal comprising a duct with an inlet end and an outer end, supports under said duct for supporting the same above ground in generally horizontal position, said duct having longitudinally spaced slurry discharge openings, said inlet end adapted to be connected to a supply of slurry under pressure whereby said slurry can be discharged from said duct directly unto the ground with the solid content of said slurry gradually forming dyke portions under and adjacent said duct along the length thereof and progressively obstructing said openings from said inlet end to said outer end, said duct is composed of two or more duct sections in end-to-end relation with connector at each end of each section for connecting said sections, each duct section has a hook fixed to and upwardly protruding from its ceiling at the center of gravity of said section to be bodily lifted and transported, said connectors include a pair of transversely registering ears upstanding from each end of said section, the ears at one end overlapping and removably attached to the ears at another end of an adjacent section whereby an additional section can be connected pin to an already installed section while inclined and then lowered to become in abutment with said already installed section with the adjacent ends of said two sections in abutment and in alignment.

8. A slurry distributor controlling the slurry composition in a way allowing for dyke building or general tailings disposal comprising a duct with an inlet end and an outer end, supports under said duct for supporting the same above ground in generally horizontal position, said duct having longitudinally spaced slurry discharge openings, said inlet end adapted to be connected to a supply of slurry under pressure whereby said slurry can be discharged from said duct directly unto the ground with the solid content of said slurry gradually forming dyke portions under and adjacent said duct along the length thereof and progressively obstructing said openings from said inlet end to said outer end, each of said supports is a combination of box-like members with a downwardly extending skirt at the bottom of said support.

9. A slurry distributor as defined in claim 8, further including a duct connector removably fitted to said inlet end of said duct, having a rectangular cross-section at one end to conform with the cross-sectional shape of said duct and having circular cross-section at the other end to be connected to a slurry supply cylindrical pipe.

10. A slurry distributor as defined in claim 7, further including spaced apart sleeve members secured to the underside of one of said duct sections spaced apart to receive the forks of a fork-truck and inclined with respect to the longitudinal axis of said duct section so that said duct section is inclined to the horizontal when lifted by the forks of said lift truck.

11. A slurry distributor as defined in claim 10, further including hook means at the center of gravity of said duct section protruding upwardly from the ceiling of the same.

\* \* \* \* \*